United States Patent [19]

Smith

[11] 4,179,612
[45] Dec. 18, 1979

[54] RADIATION TRACKING CONTROL

[76] Inventor: Peter D. Smith, 1912 Kathryn Ct., Bakersfield, Calif. 93308

[21] Appl. No.: 2,884

[22] Filed: Jan. 12, 1979

[51] Int. Cl.² ............................................. G01J 1/20
[52] U.S. Cl. .................................. 250/203 R; 126/425
[58] Field of Search ................ 250/203, 209; 356/141, 356/152; 126/270, 271

[56] References Cited

U.S. PATENT DOCUMENTS

| | | | |
|---|---|---|---|
| 3,996,460 | 12/1976 | Smith | 250/209 |
| 3,996,917 | 12/1976 | Trihey | 250/203 R |
| 4,031,385 | 6/1977 | Zerlaut et al. | 356/152 |

*Primary Examiner*—David C. Nelms
*Attorney, Agent, or Firm*—William W. Haefliger

[57] ABSTRACT

A control system for radiation tracking apparatus comprises:
(a) photo sensors to receive incident radiation,
(b) edge means to intercept radiation directed toward each sensor so that primary and secondary locations on each sensor respectively receive and do not receive incident radiation, the sensors controlling tracking movement of the apparatus,
(c) the sensors being electrically energized and having electrical outputs which vary a function of radiation interception by the sensors, and there being means responsive to said outputs to control said tracking movement,
(d) and there being control means connected with the sensors and responsive to increases and decreases in the intensity of said radiation to respectively decrease and increase electrical energization of the sensors.

22 Claims, 5 Drawing Figures

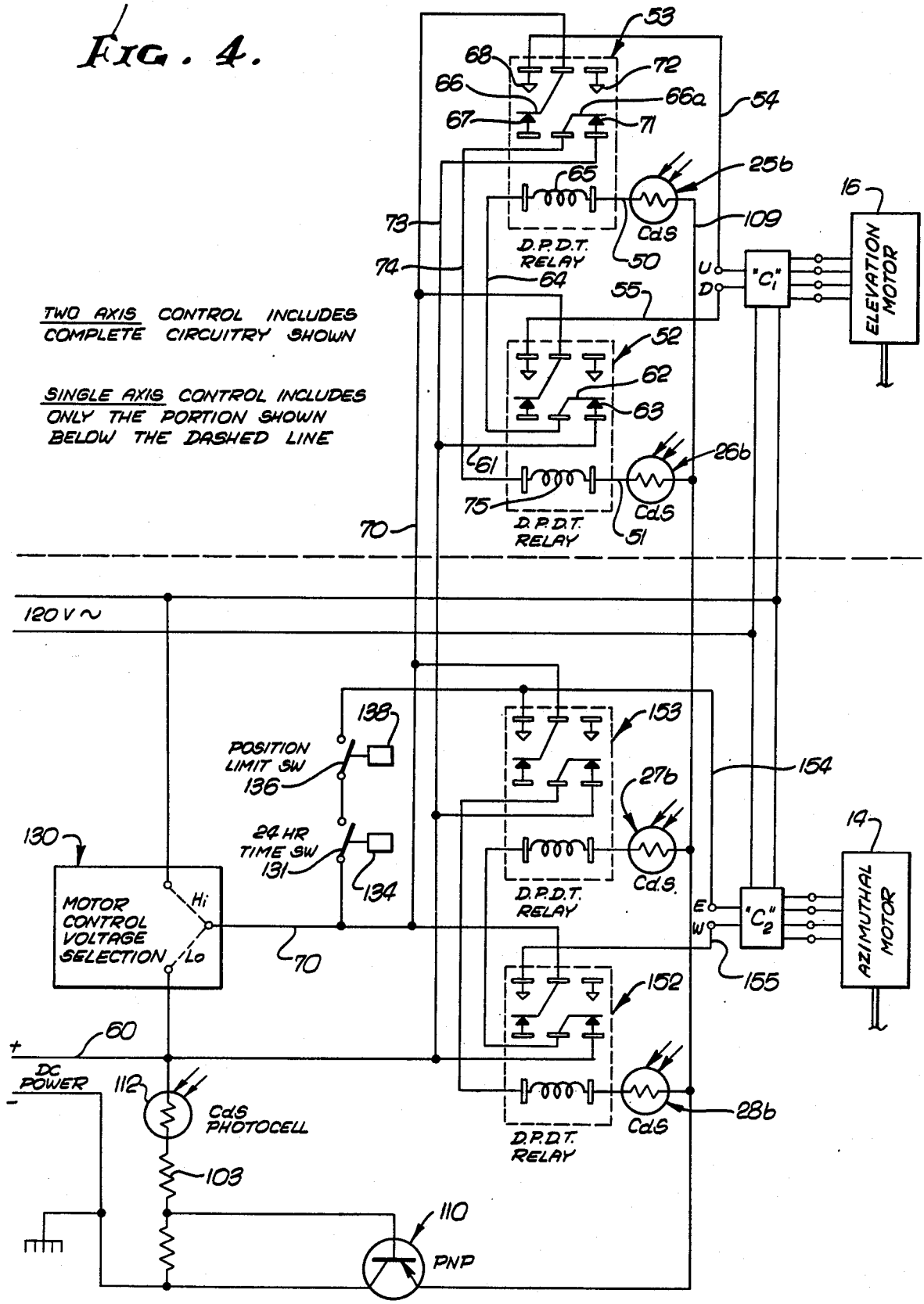

4,179,612

RADIATION TRACKING CONTROL

BACKGROUND OF THE INVENTION

This invention relates generally to radiation tracking control systems; more specifically, it concerns a simple, effective radiation or solar tracking system which is shadow seeking rather than direct sunlight seeking.

Prior solar tracking controls have suffered from excess complexity, as well as erratic performance. The latter was in some cases due to a design which required that the sensors seek sunlight incidence thereon. In addition, none of such prior controls met all of the following requirements, to my knowledge:
 A. Economical production components;
 B. Simple circuitry and absence of sophisticated electronic components;
 C. Absence of refracting optics;
 D. Complete servicability by existing skills of heating-cooling system service personnel;
 E. High accuracy within practical and useful limits;
 F. The ability to ignore light sources other than the sun;
 G. Elimination or reduction of sensitivity variations due to changing atmospheric characteristics.

SUMMARY OF THE INVENTION

It is a major object of the invention to overcome prior problems and meet all of the above requirements, through provision of an unusually advantageous radiation tracking control system employing a shadow seeking principle of operation. Basically, the control system includes the following elements:
 (a) mounting means and two photo sensors carried thereby to receive incident radiation,
 (b) edge means to intercept radiation directed toward each sensor so that primary and secondary locations on each sensor respectively receive and do not receive incident radiation, the sensors controlling tracking movement of the apparatus,
 (c) the sensors being electrically energized and having electrical outputs which vary as a function of radiation interception by the sensors, and there being means responsive to said outputs to control said tracking movement,
 (d) and there being control means connected with the sensors and responsive to increases and decreases in the intensity of said radiation to respectively decrease and increase electrical energization of the sensors.

Further, and as will appear, the means providing the cut-off edges may comprise structure such as a mask supporting shadow line producing edges, there typically being multiple photo sensors for both azimuthal and elevational control; the control means may include another sensor carried by a radiation divider or by the mask; each sensor may advantageously include a photocell, and a darkening wafer or cover in the path of radiation transmission to the photocell; the drive means may include a primary drive connected with the first and second photocells, and a secondary drive connected with the third and fourth photocells; each such drive may include DPDT relays interconnected with the two photocells in the may be simple manner to be described; and limit and timer switches integrated into the circuitry for purposes as will appear.

These and other objects of the invention, as well as the details of an illustrative embodiment, will be more fully understood from the following description and drawings, in which:

DRAWING DESCRIPTION

FIG. 1 is a perspective view of equipment for tracking the sun;
FIG. 2 is a perspective view, partly broken away, showing internal structure of a shadow box;
FIG. 3 is an exploded view of a photo sensor as used in the shadow box;
FIG. 4 is a sensor wiring diagram; and
FIG. 5 is a modified shadow box interior arrangement.

DETAILED DESCRIPTION

Figure 1:
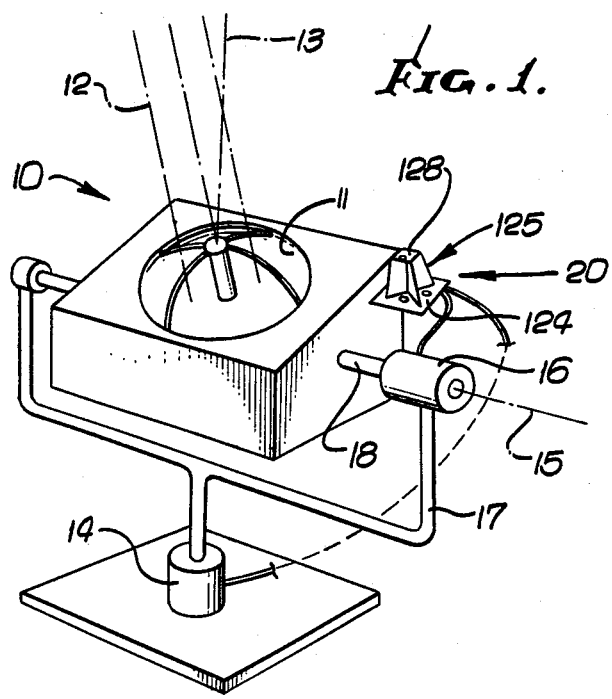

Referring first to FIG. 1, apparatus 10 is adapted to track the sun as it passes overhead. Such apparatus may take any form, such as, for example, a solar heater having a means such as a parabolic reflector type solar collector 11 receiving impingement of the sun's rays 12. The apparatus may be rotated about a vertical axis 13 as by motor 14, and also about a horizontal axis 15 as by motor 16 to accomplish such tracking, and for this purpose the motor 16 is carried by a U-shaped frame 17 that is in turn rotated about axis 13 by motor 14. Motor 16 rotates a shaft 18 about axis 15, the shaft supporting apparatus 10. This description is merely to illustrate one way of effecting azimuthal tracking and elevational tracking of the sun's rays by apparatus 10.

Figure 2:
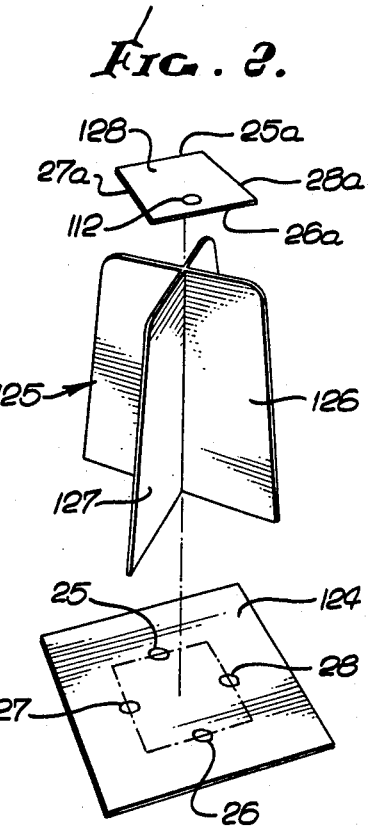

In accordance with the invention a control system is provided to control such azimuthal and/or elevational tracking. That system includes a shadow unit 20 which may for example move with apparatus 10, and for that purpose may be mounted to the apparatus as is seen in FIG. 1. The elements of the unit, as also seen in FIG. 2, typically include four photo sensors schematically shown at 25–28 located on a bottom plate 124 to receive incident radiation, as for example sunlight. First and second sensors 25 and 26 respectively have upper and lower locations and outputs controlling elevational tracking movement of the unit 20 as well as apparatus 10; and, third and fourth sensors 27 and 28 have left and right locations to provide outputs controlling azimuthal tracking movement of the unit 20 and apparatus 10.

The unit includes shield structure 125 defined by two panels 126 and 127 extending generally in the direction of radiation reception and providing four isolated reception zones respectively associated or aligned with the sensors. The panels extend normal to one another, as shown. A shadow mask 128 is carried by the shield structure and has edges, as for example at 25a, 26a, 27a and 28a (corresponding to the photo sensors) which are located to variably cut-off direct incidence of radiation on certain sensors in response to relative azimuthal and elevational rotation between the unit and the direction of radiation transmission, thereby to alter the outputs of said certain sensors; further, control means is provided to be responsive to such altered outputs to control the tracking movement of the unit and apparatus 10. The edges 25a and 26a are vertically offset and extend in parallel relation, left to right, whereas edges 27a and 28a are laterally spaced and extend in vertical parallel relation. The edges 25a and 26a are shown to extend generally at right angles to edges 27a and 28a, whereby the four edges extend generally rectangularly.

Figure 3:
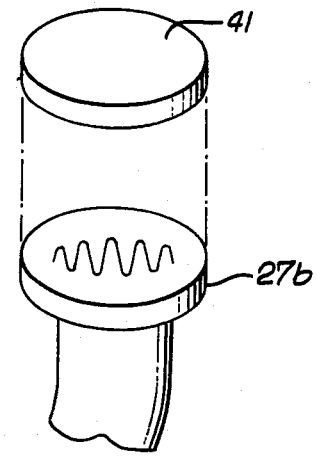

Referring now to FIG. 3, at least one photo sensor (as shown in axially exploded arrangement) and preferably each photo sensor, includes a photocell as at 27b, and a fixed density filter disc or cover 41 in the path of radiation transmission to the cell. Cover 41 regulates the percentage of available light impressed on the photocell. One example of the cover material is the product known as "PLEXIGLAS" acrylic, colored, produced by Rohm & Haas, Philadelphia, Pa.

Referring to FIG. 4, the two photocells 25b and 26b associated for example with the photo sensors 25 and 26 respectively, are connected at 50 and 51 with the double pole double throw relays 53 and 52, respectively. The output of relay 53 is provided on lead 54 connected to up "U" terminal of motor control $C_1$ and the output of relay 52 is provided on lead 55 connected to down "D" terminal of motor control $C_1$. These terminals supply forward or reverse AC current to the control $C_1$ for drive motor 16, controlling up and down pivoting of the unit. Similarly, the two photocell 27b and 28b are connected to DPDT relays 152 and 153 whose outputs are connected via leads 154 and 155 to terminals "E" and "w" of control $C_2$ for motor 14 that provides left and right pivoting of the unit 20 and apparatus 10.

Sunlight entering the unit 10 passes through the reception zones formed by the panels 126 and 127, and strikes each of the four sensors approximately in the center when the unit is directed straight toward the direction of the sun. In this position of the unit, the edges 25a-28a are located in positions where they will just let the relays remain open. Any movement of the sun relative to the unit will then bring enough direct rays to either one or two sensors (in opposite axes) to cause the associated relays to close, thereby energizing the actuators or motors to move the trackng system in the direction of the sun's movement. The shadow unit, being fastened directly to the framework of the tracking system, will then keep the tracking system aligned with the sun.

It should be noted that the control system is shadow seeking. Each sensor is energized only when the direct rays of the sun fall directly upon it. The energized sensor activates the associated relay, operating an actuator or motor on the parent machine, which will bring the sensor back into a shadow area on the back of the shadow unit. It then deenergizes and the system is at rest. During periods of dark or reduced light, as experienced during cloudy weather, the system is at rest and does not seek a light which is not available. The system activates immediately upon return of direct sunlight and aligns itself to the light source by returning all four sensors to their respective shadow areas within the shadow unit.

Referring again to FIG. 4, each photocell must (1) pass enough current to close the associated D.P.D.T. relay when exposed only to the direct rays of the sun, and (2) pass little enough current so as to let the relay open when the shadow line projected from the window crosses the photocell, even though there is considerable extraneous light entering the shadow unit.

To these ends, photocell 25b is shown connected in a circuit that includes DC power supply 60, lead 50, lead 61, arm 62, contact 63, lead 64, coil 65 of relay 53, lead 109, emitter - collector circuit of transistor 110 and ground. Accordingly, when the photocell 25b conducts sufficiently, relay 53 is operated, i.e. arm member 66 moves to disengage contact 67 and engage contact 68, whereby full line voltage is applied via lead 70, contact 68, and lead 54 to the U terminal. This means that the shadow unit is driven in a direction to cause photocell 25b to receive less direct sunlight, i.e. to seek shadow, until relay 53 is deactivated in response to less current output by cell 25b. At that time, shadow line 53a, crosses the sensor 25.

It will be noted that when relay 53 is then activated to drive the motor 16, relay 52 is deactivated. This is effected by virtue of the fact that the circuit of photocell 25b is broken when arm member 66 moves upwardly, i.e. the arm member 66a also moving upwardly to disengage contact 71 and to engage contact 72, breaking the circuit that includes cell 26b, lead 51, power supply lead 73, contact 71, lead 74, and coil 75 of relay 52. Accordingly, when the motor is energized to move in one direction, it cannot be energized to move in the opposite direction, and vice versa.

The other photocells 27b and 28b cooperate with relays 152 and 153 to control motor 14 in similar manner.

In accordance with an important aspect of the invention, control means is provided and connected to the sensors, the control means being responsive to increases and decreases in the intensity of the incident radiation (sunlight for example) so as to respectively decrease and increase electrical energization of the sensors. Such control means may typically comprises a voltage control circuit that includes P-N-P transistor 110 with its emitter-collector circuit connected with the photocells 25b-28b. The voltage control circuit also typically includes an additional sensor as at 112 to receive incident radiation, that sensor connected with the transistor grid, as via a resistor 103. Thus, the photocell 112 biases the grid to obtain variations in voltage output which are inversely proportional (or are inverse functions) of the radiation intensities incident on the control photocell 112. The latter is typically of the same construction as sensors 25-28, i.e. as shown in FIG. 3. The control is such that the lower incident radiation intensities produce higher voltage energization of the tracking sensors and vice versa. As a result, a more accurate, immediate and uniform tracking response is provided for varying incident light conditions, as experienced during atmospheric changes due to clouds, dust, haze, smog, fog, or variations in solar elevations.

The front plate or mask 128 may provide support for the voltage control sensor 112, as shown in FIG. 2, so as to be unaffected by the operation of the mask to control shadow lines on the tracking sensors. Note that the dividers 126 and 127 operate to prevent radiation (such as light) from one zone associated with one sensor passing to another zone associated with another sensor to effect the latter. Two sensors are used when rotation about one axis only is employed; and four sensors are added when rotation about two axes is used.

Each sensor has a "field of view" or sensitivity range (the ability to see light) through an arc of 90 degrees. Two opposite sensors working collectively therefore will be able to sense light throughout a field of 180 degrees, and will signal to their respective relays with light coming from any direction within this 180 degree field. The sensors are shadow seeking. Light striking a sensor activates that sensor, which operates the relay necessary to run the positioning motor in a direction which will bring that sensor into a shadow position behind the front mask. Each pair of opposite sensors cooperate to operate the tracking cntrol to cause movement of a parent machine in both directions about one axis. Horizontally paired sensors signal for azimuthal movement. Vertically paired sensors signal for elevation movement.

This tracking control also has the capability of selectively operating motor controls which are actuated by either line voltage or low voltage. See high or low voltage control 130 connected as shown in FIG. 4. By operating the control 130 located at a point ahead of a time switch 131 to either (1) line voltage or (2) low voltage, selection is made to correspond with the type or requirement of the motor control used with the actuating motor. It should be noted that the motor control (as at $C_1$ or $C_2$) may be designed to have provision for time delay capabilities in the range of a three to ten second duration.

The time switch is set to activate only during the period after sunset and before sunrise. A "Setting" control for time switch 131 is indicated at 134. It is used to actuate the azimuthal motor 14 in a direction which will render the parent machine into a heading of the approximate sunrise quadrant.

The limit switch 136 connected in series with switch 131 is a NORMALLY ON switch which opens the circuit of the above return cycle when the parent machine achieves a physically pre-determined position in the easterly quadrant. A stop to actuate switch 136 is indicated at 138. Precise positioning is not required for this "return", as sensor tracking becomes operational at sunrise. It is important only to place the machine and tracking control into a position where the control sensors can "see" the sunlight at sunrise.

When the apparatus is to be used with a non-focusing type solar collector and absolute directional tracking is not of primary importance, the electrical circuitry can be simplified by eliminating the variable voltage control selector 130. In this configuration, the full DC voltage from source 60 is applied to the tracking sensors at all times. The result will be that, in use of the control in this configuration, some over-sensitive "hunting" will occur during periods of intense light, and some slight lag in response will occur in periods of weak light, but the control will maintain a tracking accuracy which is sufficient for non-focusing type, solar collectors.

Figure 5:
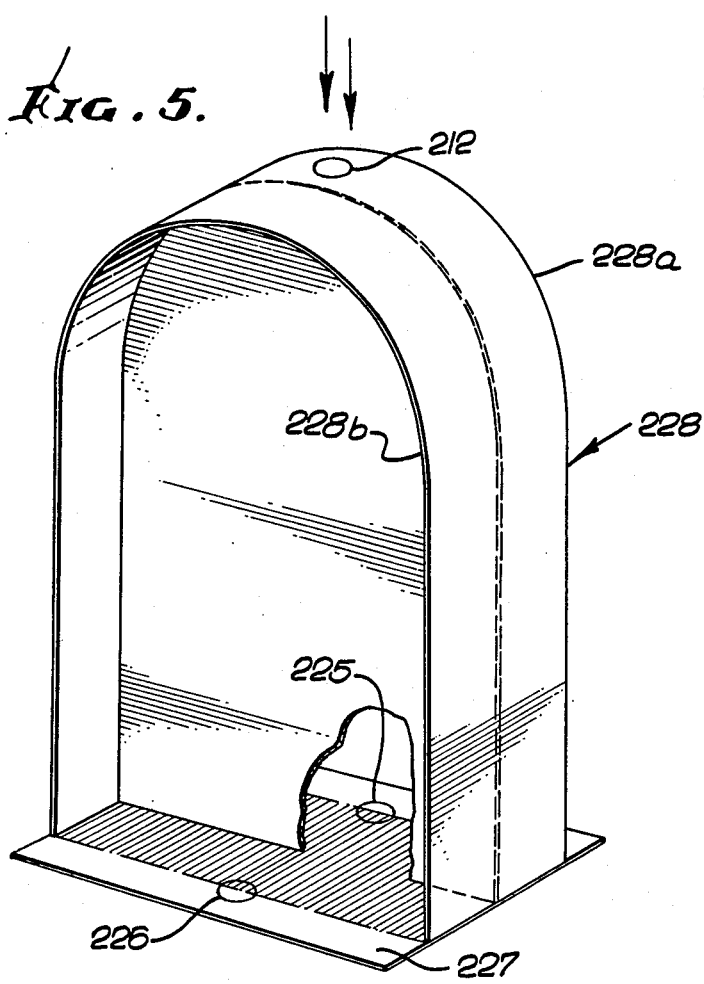

FIG. 5 shows a modified arrangement of sensors 225 and 226 (corresponding to sensors 25 and 26) on a mounting plate 227 over which an inverted U-shaped mask or divider 228 projects. That mask has edges 228a and 228b (which corresponds to edges 27a and 28a) and which are adapted to provide shadow lines extending across the sensors in the same manner as directed above. A voltage control sensor 212 (corresponding to sensor 112) is supported on the inverted base of that mask, as shown.

The present invention improves over that of my prior U.S. Pat. No. 3,996,460.

I claim:

1. In radiation tracking apparatus,
   (a) mounting means and two photo sensors carried thereby to receive incident radiation,
   (b) edge means to intercept radiation directed toward each sensor so that primary and secondary locations on each sensor respectively receive and do not receive incident radiation, the sensors controlling tracking movement of the apparatus,
   (c) the sensors being electrically energized and having electrical outputs which vary as a function of radiation interception by the sensors, and there being means responsive to said outputs to control said tracking movement,
   (d) and there being control means connected with the sensors and responsive to increases and decreases in the intensity of said radiation to respectively decrease and increase electrical energization of the sensors.

2. The apparatus of claim 1 wherein said control means comprises a voltage control circuit.

3. The apparatus of claim 2 wherein said circuit includes a transistor having an emitter connected with the sensors.

4. The apparatus of claim 1 including shield structure extending generally in the direction of radiation reception and providing at least two isolated radiation reception zones respectively associated with said sensors.

5. The apparatus of claim 3 wherein said circuit includes a third sensor to receive said radiation, said sensor connected with the transistor.

6. The apparatus of claim 5 including shield structure extending generally in the direction of radiation reception, and providing two isolated radiation reception zones respectively associated with the first two sensors, said third sensor associated with said shield structure.

7. The apparatus of claim 6 including shield structure extending generally in the direction of radiation reception, and providing four isolated radiation reception zones respectively associated with the first four sensors, said fifth sensor associated with said shield structure.

8. The apparatus of claim 5 wherein the third sensor includes a photocell having a light restricting cover of fixed optical density.

9. The apparatus of claim 1 including relays connected with the sensors to be operated thereby, drive motor means operated by current supply from the relays, and means to selectively supply relatively high and relatively low motor control voltage to the motor means via said relays.

10. The apparatus of claim 1 including relays connected with the sensors to be operated thereby, drive motor means operated by current supply via the relays to displace the sensors, means to supply current to the motor means via the relays, and a timing switch responsive to predetermined time relapse to interrupt said current supply.

11. The apparatus of claim 1 including relays connected with the sensors to be operated thereby, drive motor means connected to current supply via the relays to displace the sensors, means to supply current to the motor means via the relays, and a stop switch responsive to predetermined displacement of the sensors to interrupt said current supply.

12. The apparatus of claim 3 including shield structure extending generally in the direction of radiation reception, and having edges providing shadow lines associated with the sensors.

13. The apparatus of claim 12 wherein the voltage control circuit includes another radiation sensor mounted on said shield structure and connected with the transistor.

14. The apparatus of claim 13 wherein the shield structure is U-shaped.

15. The apparatus of claim 13 wherein each sensor includes a photocell, and a darkened translucent cover in the path of radiation incidence on the photocell.

16. In radiation tracking apparatus
   (a) mounting means and four photo sensors carried thereby to receive incident radiation,
   (b) edge means to intercept radiation directed toward each sensor so that primary and secondary locations on each sensor respectively receive and do not receive incident radiation, first and second of the sensors controlling tracking movement of the apparatus in one direction and third and fourth of the sensors controlling tracking movement of the apparatus in another direction, (c) the sensors being electrically energized and having electrical outputs which vary as a function of radiation interception by the sensors, and there being means responsive to said outputs to control said tracking movement, (d) and there being control means connected with the sensors and responsive to increases and decreases in the intensity of said radiation to respectively decrease and increase electrical energization of the sensors.

17. The apparatus of claim 16 wherein said control means comprises a voltage control circuit.

18. The apparatus of claim 17 wherein said circuit includes a transistor having an emitter-collector connected with all of said sensors.

19. The apparatus of claim 16 including a two axis support for said mounting means whereby the mounting means is movable about one axis in said one direction for elevational tracking, and the mounting means is movable about the second axis in said other direction for azimuthal tracking.

20. The apparatus of claim 16 including shield structure extending generally in the direction of radiation travel toward said sensors, said structure providing four isolated radiation reception zones respectively associated with said sensors.

21. The apparatus of claim 18 wherein said circuit includes a fifth sensor to receive said radiation, said fifth sensor connected with the transistor.

22. The apparatus of claim 21 wherein the fifth sensor includes a photocell having a light restricting cover of fixed optical density.

* * * * *

UNITED STATES PATENT AND TRADEMARK OFFICE
CERTIFICATE OF CORRECTION

PATENT NO. : 4,179,612
DATED : December 18, 1979
INVENTOR(S) : Peter D. Smith

It is certified that error appears in the above-identified patent and that said Letters Patent are hereby corrected as shown below:

Column 4, line 29; "radiation, that sensor connected with the transistor grid," should read --radiation, that sensor connected with the transistor base,--

Column 4, line 31; "grid to obtain variations in voltage output which are" should read --base to obtain variations in voltage output which are--

Column 5, line 33; "selector 130. In this configuration, the full DC voltage" should read --112, 103 and 110. In this configuration, the full DC voltage--

Signed and Sealed this

Twelfth Day of August 1980

[SEAL]

Attest:

SIDNEY A. DIAMOND

Attesting Officer

Commissioner of Patents and Trademarks